W. M. COWELL.

WHEEL CONSTRUCTION AND MOUNTING.

APPLICATION FILED NOV. 12, 1918.

Reissued June 10, 1919.

14,659.

2 SHEETS—SHEET 1.

Inventor

W. M. Cowell

By Watson E. Coleman

Attorney

THE NORRIS PETERS CO., PHOTO-LITHO., WASHINGTON, D. C.

W. M. COWELL.

WHEEL CONSTRUCTION AND MOUNTING.

APPLICATION FILED NOV. 12, 1918.

Reissued June 10, 1919.

14,659.

2 SHEETS—SHEET 2.

Inventor

W. M. Cowell

By Watson E. Coleman

Attorney

THE NORRIS PETERS CO., PHOTO-LITHO., WASHINGTON, D. C.

UNITED STATES PATENT OFFICE.

WILLIAM M. COWELL, OF EVANSVILLE, INDIANA.

WHEEL CONSTRUCTION AND MOUNTING.

14,659. Specification of Reissued Letters Patent. Reissued June 10, 1919.

Original No. 1,235,659, dated August 7, 1917, Serial No. 132,126, filed November 18, 1916. Application for reissue filed November 12, 1918. Serial No. 262,256.

*To all whom it may concern:*

Be it known that I, WILLIAM M. COWELL, a citizen of the United States, residing at Evansville, in the county of Vanderburg and State of Indiana, have invented certain new and uesful Improvements in Wheel Constructions and Mountings, of which the following is a specification, reference being had to the accompanying drawings.

This invention relates to an improved wheel construction and mounting, and has for its primary object to provide simple, effective and reliable means for retaining the wheel upon the supporting axle, which is especially designed for use in connection with cars of that character generally employed in the operation of industrial plants, such as coal, lead and zinc mines, blast furnaces, and the like.

It is another object of the invention to provide a device for the above purpose especially applicable to small cars having their wheels loosely mounted for rotation with respect to the supporting axles, and to provide a retaining means for the wheel which has a direct connection to the axle so that the wheel will be held against axial shifting movement independently of the bearing or pedestal in which the axle is journaled.

It is also an important purpose of the invention to provide a simple and effective connection between the retaining means and the axle which will permit of the free rotation of the axle in its bearing while the retaining means remains stationary.

The invention also contemplates the provision of an improved wheel construction and mounting and retaining means for the wheel which will permit of the easy and quick removal of the latter from the axle and its proper adjustment so as to compensate for wear while, at the same time, the weakening of the axle pedestal or bearing by the connection of the retaining means thereto is obviated, and the bearing relieved of excessive strains.

It is likewise one of the detail objects of my invention to provide a key of improved construction for the purpose of retaining the wheel upon the axle and preventing its relative longitudinal movement thereon.

It is a further general object of my invention to provide a device of the above character which consists of relatively few parts of simple and durable construction and which may be manufactured at comparatively low cost.

With the above and other objects in view, the invention consists in the novel features of construction, combination and arrangement of parts to be hereinafter more fully described, claimed and illustrated in the accompanying drawings, in which, Figure 1 is a vertical sectional view of the wheel illustrating the mounting of the same and the preferred embodiment of my improved retaining means;

Figure 2:
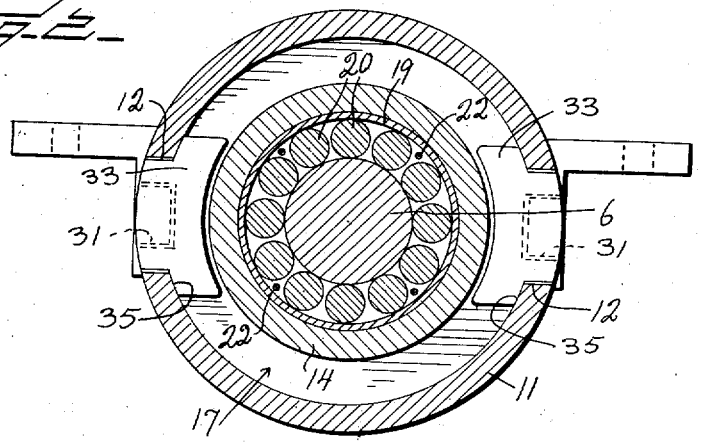
Fig. 2 is a section taken on the line 2—2 of Fig. 1.
Figure 1:
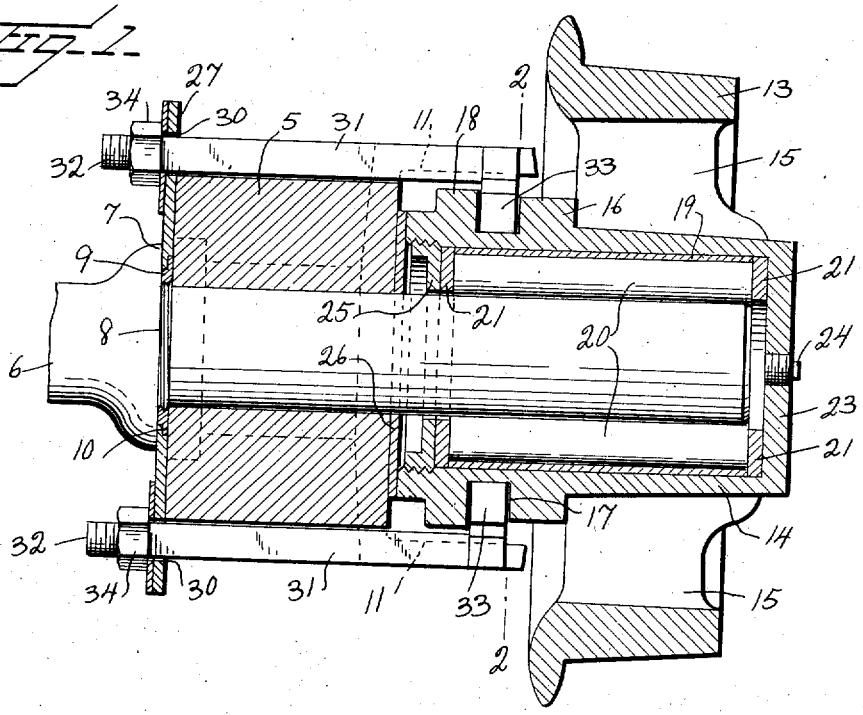
Figure 3:
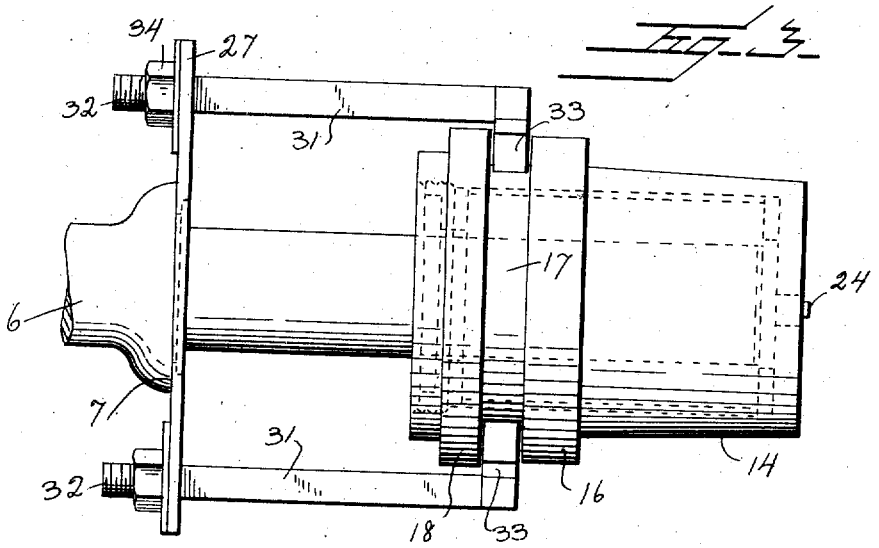
Fig. 3 is a side elevation, the axle bearing being omitted.
Figure 6:
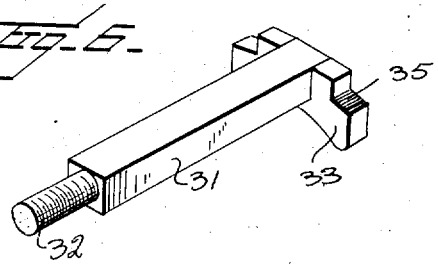
Fig. 6 is a detail perspective view of one of the yoke members.
Figure 4:
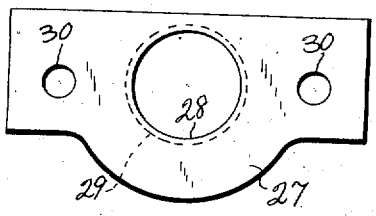
Fig. 4 is a detail elevation of the relatively stationary plate mounted upon the wheel axle.
Figure 5:
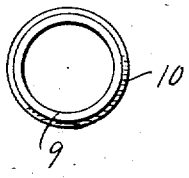
Fig. 5 is a similar view of the washer plate fixed upon the axle and upon which the plate shown in Fig. 4 is mounted.

In the construction of small cars used for industrial purposes, the car wheel has heretofore been held in its proper position upon the axle by one of two means quite generally employed. In either case, it has been customary to provide the inner end of the wheel hub with an annular groove to receive flanges on the axle bearing or pedestal which is constructed in two sections or as an alternative means for holding the wheel in place upon the axle, bolts are inserted through the pedestal and engage in the groove on opposite sides of the wheel hub. The objection to the first construction is that the wheel can only be removed from the axle with considerable difficulty, owing to the fact that it is first necessary to remove the two bearing sections, and there is also an excessive amount of wear on the projecting flange of the bearing. In the second construction, the bearing is subjected to an excessive strain by the insertion of the pins or keys through the weakest part thereof. It is also quite difficult and requires considerable time in order to remove these keys so that the wheel may be removed from the axle. It is the purpose of my invention to provide a retaining means for the wheel which is directly mounted upon and supported by the wheel axle so that no strain will devolve upon the bearing, and which can also be very quickly applied or removed with the wheel. To this end, the bearing or pedestal, indicated at 5, is in the form of a single integral casting suitably bored to receive the end of the axle 6 which is rotatably mounted therein. This wheel axle is formed with an annular shoulder 7, and adjacent to said shoulder is threaded, as at 8, to receive an annular washer plate 9 which is interposed between the inner side face of the axle bearing and the shoulder 7. The outer edge of this washer plate is rabbeted, as at 10, for a purpose which will hereinafter be clearly explained. The bearing 5 is formed with a radially offset, outwardly projecting, annular flange 11, and this flange, at diametrically opposite points, is slotted, as indicated at 12.

The wheel 13 includes a suitably formed rim or tread portion which is connected to the hollow hub 14 by radially extending spokes 15 in the usual manner. The inner end portion of the hub 14 is of increased external diameter and projects beyond the inner side of the wheel proper, as indicated at 16. This enlarged end of the wheel hub is formed with an external annular groove 17, and at the outer side of said groove, an annular flange 18 is formed on the wheel hub. Within the hub chamber, a metal sleeve or bushing 19 is arranged in engagement with the hub wall, and between said bushing and the periphery of the wheel axle 6, a plurality of bearing rollers 20 are disposed. These rollers, at their ends, are formed with trunnions mounted in the spaced cage rings 21. The cage rings are connected together and held against relative movement by a number of small rods or bolts 22. It is to be observed that the sleeve or bushing 19 is disposed between the outer edges of the cage rings 21 so that it is held against longitudinal shifting movement with respect to the bearing rollers 20. The outer end of the hub 14 is closed by the cap wall 23, said wall having a central opening through which a lubricant may be supplied to the interior of the wheel hub, which opening is closed by a threaded plug 24. At its inner end, the wall of the hub chamber is threaded to receive an exteriorly threaded disk 25 which prevents longitudinal shifting movement of the bearing rollers and the cage outwardly through the opening in the hub. A washer plate 26 is disposed upon the wheel axle between the inner end of the hub and the face of the bearing 5.

A plate 27 is adapted to be arranged against the inner face of the bearing 5, said plate having an opening 28 therein, the edge of which is rabbeted, as at 29, for engagement with the rabbeted edge 10 of the washer plate 9 secured upon the wheel axle. The opposite ends of the plate 27 project beyond the opposite sides of the bearing 5 and each of said projecting ends of the plate has an opening 30 therein. These openings receive the cylindrical, threaded end portions 32 of a pair of rectangular rods 31. The other end portions of said rods loosely fit within the respective slots 12 in the flange 11 of the bearing, and upon the extremity of each of the rods, a yoke block 33 is integrally formed. These yoke blocks engage in the peripheral groove 17 in the inner end of the wheel hub on diametrically opposite sides thereof. Suitable nuts 34 are threaded upon the ends 32 of the rod so that the yoke blocks will be adjusted longitudinally with respect to the wheel hub and said blocks retained in their proper position. It will be noted, from reference to Fig. 2 of the drawings, that the shoulders 35 formed in the upper edges of the yoke blocks at each end thereof, extend beyond the opposite edges of the slots 12 and contact with the inner face of the flange 11.

From the foregoing description, taken in connection with the accompanying drawings, the construction and arrangement of the several elements of my invention will be clearly and fully understood. It has been found in practice that it is preferable to mount the wheel axle so that it may rotate independently of the wheels. It is for this reason that I provide the plate 27 to which the yoke rods 31 are connected. This plate being mounted upon the washer 9 remains stationary with respect to the washer and the wheel bearing when the axle revolves, though it is to be noted that the yokes are connected to the axle through said washer plate and the plate 27. The strain or pull upon the retaining yoke is, of course, in the line of the axle, but as there is no positive connection between the yoke rods 31 and the axle bearing or pedestal, the latter is not subjected to excessive strains as in the other wheel constructions hereinbefore mentioned. Such wear as does occur between the several parts may be readily compensated for by the adjustment of the nuts 34 on the inner ends of the yoke members. It will be at once seen that by means of my improved mounting and retaining means for the wheel, the latter may be very easily and quickly applied to the end of the wheel axle or removed therefrom by simply removing the nuts 34 from the ends of the yoke rods. The yoke blocks 33 which are engaged at diametrically opposite sides in the groove 17 in the wheel hub, permit of the free rotation of the wheel with respect to the axle, and, at the same time, effectually prevent axial shifting movement of the wheel and its possible release from the axle. The construction and relative arrangement of the several elements provides an exceedingly simple, reliable and durable construction and one which may be produced at small manufacturing cost.

The mounting and arrangement of the key or yoke members with respect to the axle bearing, while of primary importance, is not absolutely essential, as it is manifest that the shanks of these key or yoke members might be otherwise mounted than in the plate 27 which is supported directly on the wheel axle. Also, a key or yoke member of the specific form and construction herein described might be advantageously employed for retaining the wheel in its applied position in numerous other combinations or associations with the pedestal or bearing for the wheel axle. Therefore, such obvious rearrangements of the parts or variations in the mounting and detail structural parts thereof are to be considered within the contemplation of the present invention.

While I have shown and described the preferred construction and arrangement of the several parts, it is, of course, to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with the axle and bearing therefor, of a wheel rotatably mounted upon the axle, a relatively stationary supporting member independent of the bearing, and retaining means connected to said member and operatively engaged with the wheel independently of the bearing to hold the wheel against axial shifting movement.

2. The combination with the axle and bearing therefor, of a wheel rotatably mounted upon the axle at one side of the bearing, a relatively stationary member supported upon the axle independently of the bearing, and retaining means operatively engaged with the wheel and mounted in said member.

3. The combination with the axle, of a wheel rotatably mounted upon the end of the axle having a peripheral groove in its hub, a relatively stationary plate mounted upon and supported by the axle in spaced relation to the wheel hub, and yoke members connected to said plate and engaged in the diametrically opposite sides of said groove to prevent axial shifting movement of the wheel on the axle.

4. The combination with the axle, of a wheel rotatably mounted upon the end of the axle, said axle having a shoulder formed thereon, an annulus secured upon the axle against said shoulder, a plate having an opening to receive said annulus, said annulus and plate being provided with coacting means to retain the plate against the shoulder on the axle, and yoke members engaged in diametrically opposite sides of the groove in the wheel hub and detachably connected to said plate.

5. The combination of the rotatably mounted axle, of a wheel rotatably mounted upon the end of the axle and provided in its hub with a peripheral groove, a relatively stationary plate supported upon the axle, and retaining means for the wheel engaged in the groove of the wheel hub and connected to said plate.

6. The combination with the axle and bearing in which the axle is journaled, of a wheel rotatably mounted upon the axle at one side of the bearing, a relatively stationary plate supported upon the axle on the other side of the bearing, and retaining means operatively engaged with the wheel hub at diametrically opposite points and connected to said plate.

7. The combination with the axle and bearing in which the axle is journaled, said axle being provided with a shoulder, of a wheel rotatably mounted upon the axle on one side of the bearing, a relatively stationary plate supported upon the axle between the opposite side of the bearing and said shoulder, and retaining means for the wheel detachably connected to said plate and operatively engaged with the wheel hub.

8. The combination with the axle and bearing in which the axle is journaled, said axle being provided with a shoulder, of a wheel rotatably mounted upon the axle on one side of the bearing, a relatively stationary plate supported upon the axle between the opposite side of the bearing and said shoulder, the wheel hub being provided with a peripheral groove, and yoke members engaged in the opposite sides of said groove and detachably connected to said plate.

9. The combination with the axle and bearing in which the same is journaled, said bearing having a longitudinally projecting, slotted flange, of a wheel rotatably mounted on the axle at one side of the bearing, the hub of the wheel extending within the bearing flange and being provided with a peripheral groove, retaining means disposed within the slots of the bearing flange and engaged in the groove in the wheel hub, and means connecting the retaining means to the axle on the opposite side of the bearing.

10. The combination with the axle and bearing in which the same is journaled, of a wheel rotatably mounted on the axle at one side of the bearing and provided with a peripheral groove in its hub, a relatively stationary plate mounted upon the axle at the opposite side of the bearing, rods extending in parallel relation to the bearing and detachably connected at one of their ends to said plate, each of said rods at its other end having means engaging in the groove of the wheel hub at diametrically opposite points to retain the wheel upon the axle.

11. The combination with the axle and bearing therefor having a longitudinally projecting flange, of a wheel rotatably mounted upon the end of the axle, the hub of the wheel extending within said flange on the bearing, a plate supported upon the axle at the opposite side of the bearing, and retaining elements detachably connected to said plate and having means extending beneath the flange on the bearing and operatively engaged with the wheel hub to hold the wheel against axial movement upon the axle.

12. The combination with the axle and bearing in which the axle is journaled, said bearing having a longitudinally projecting, slotted flange on one side, of a wheel rotatably mounted upon the end of the axle, the inner end of the wheel hub extending within said flange and being provided with a peripheral groove, a relatively stationary plate supported upon the axle on the opposite side of the bearing, and rods detachably connected at one of their ends to the plate and disposed in the slots on the bearing flange, each of said rods being provided with a yoke block engaged in the groove of the wheel hub at diametrically opposite points and against the inner face of said flange.

13. The combination with the axle and bearing therefor, of a wheel on the axle having an annular groove in its hub, yoke members for said wheel each having a shank extending longitudinally of the bearing but independent thereof, and a head on one end of the shank disposed at right angles to the axis thereof and engaged in the groove of the wheel hub.

14. The combination with the axle and bearing therefor, of a wheel rotatably mounted upon the axle at one side of the bearing, a relatively stationary plate engaged against the opposite side of the bearing, and wheel retaining means extending longitudinally of the bearing, said means being operatively engaged with the wheel hub and mounted in said plate.

15. The combination with the axle and bearing therefor, of a wheel rotatably mounted upon the axle at one side of the bearing, a relatively stationary plate engaged against the opposite side of the bearing, and a plurality of retaining yokes extending longitudinally of the bearing and having heads at one of their ends operatively engaged with the wheel to retain the same on the axle, said yokes at their other ends being mounted in said plate.

16. The combination with the axle and bearing therefor, a wheel on the axle having an annular groove in its hub; of retaining yokes for the wheel each consisting of a shank extending longitudinally of the bearing and having a head on one end disposed at right angles to the shank and engaged in the groove of the wheel hub, and means for supporting the other ends of the yoke shanks at the rear side of the bearing.

17. The combination with the axle and bearing therefor, a wheel on the axle having an annular groove in its hub, the bearing being formed with a flange extending over said groove, of yoke members for holding the wheel against longitudinal movement on the axle, each of said members having a head mounted in the flange of the bearing and operatively engaged in the groove of the wheel hub.

18. The combination with the axle and bearing therefor, said bearing having an annular, longitudinally projecting flange, a wheel on the axle having a hub extension disposed within said flange; of retaining members to hold the wheel against longitudinal movement relative to the axle, each of said members having a shank provided with an angular head on one end disposed within the flange on the bearing and operatively engaged with the wheel hub.

19. The combination with an axle and bearing therefor, of a wheel on the axle having an annular groove in its hub, of yoke members for said wheel, each having a shank extending longitudinally of the bearing, and a head on one end of the shank disposed at right angles to the axis thereof and engaged in the groove of the hub, and means whereby said shank may be longitudinally adjusted relative to the bearing.

20. The combination with an axle, a bearing therefor, a wheel rotatably mounted upon the axle at one side of the bearing, of yoke members for said wheel, each having a head at one end engaging in the groove of the wheel hub and having a shank extending longitudinally of the bearing, and means for supporting the inner end of each shank against the adjacent end of the bearing.

21. The combination with an axle, a bearing therefor, a wheel on the axle having an annular groove in its hub, of yoke members for holding the wheel against longitudinal movement on the axle, each of said members having a head engaged in the groove of the wheel hub, and means for operatively supporting the members against the bearing.

22. The combination with an axle and a bearing therefor, of a wheel having an outwardly extending, annular flange, retaining yokes for the wheel, each consisting of a head engaging over said flange to hold the wheel in place, and a shank, the rear end of each shank being screw-threaded, and a member bearing against the inner end of the bearing and through which said shanks pass, and nuts engaging the reduced ends of the shanks and detachably holding them in position.

In testimony whereof I hereunto affix my signature in the presence of two witnesses.

WILLIAM M. COWELL.

Witnesses:
GRAHAM F. DENBY,
F. J. SCHLOTTER.

Copies of this patent may be obtained for five cents each, by addressing the "Commissioner of Patents, Washington, D. C."